UNITED STATES PATENT OFFICE.

RALPH O. PHILLIPS, OF SOMERVILLE, MASSACHUSETTS, ASSIGNOR TO THE BARRETT COMPANY, A CORPORATION OF NEW JERSEY.

COMPOSITION OF MATTER AND PROCESS OF PRODUCING THE SAME.

1,413,557.      Specification of Letters Patent.      Patented Apr. 18, 1922.

No Drawing.      Application filed June 1, 1920. Serial No. 385,778.

*To all whom it may concern:*

Be it known that I, RALPH O. PHILLIPS, a citizen of the United States, residing at Somerville, in the county of Middlesex and State of Massachusetts, have invented certain new and useful Improvements in Composition of Matter and Processes of Producing the Same, of which the following is a specification.

This invention relates to rubber products and compositions and more particularly to dense and non-porous (as well as porous) vulcanized products and compositions and solutions of improved physical properties, having incorporated therein prior to the vulcanization, the substance, phenanthrene, hereinafter described.

In the working up of certain distillates of coal tar and coal tar pitch, there is obtained by a carefully controlled process, a solid product of characteristic composition and properties, containing from 75% of phenanthrene or lower phenanthrene content to 90% phenanthrene or by carrying the refining process further, pure phenanthrene. This phenanthrene referred to varies in color from a light yellow brown to a snow white product. It is non-saponifiable and is soluble in such common solvents as benzol, coal tar naphthas, etc. The product thus obtainable or a similar product containing phenanthrene will be hereinafter referred to as phenanthrene or as "the phenanthrene hereinbefore mentioned."

The rubber products and compositions described in this application and containing phenanthrene, have certain specific physical properties very advantageous to these compositions and to their process of manufacture.

According to the present invention, the phenanthrene above referred to, is incorporated with the rubber and other constituents of the rubber products or compositions to be vulcanized, so that the phenanthrene is present during the vulcanization with corresponding modifications of the vulcanization process, and with the production of a correspondingly modified vulcanized product. Not only is the vulcanized product itself modified, but the use of phenanthrene for this purpose results in a decidedly improved and advanced process of manufacture of rubber products and compositions.

Some of the advantages resulting from the use of the herein described phenanthrene to improve the vulcanized rubber products and compositions are as follows:

The low specific gravity of phenanthrene compared to most other constituents of rubber mixtures, reduces the volume cost of the vulcanized rubber products. The specific gravity of the phenanthrene mentioned varies from 1.06 or lower to 1.08 or higher at 15.5° C. The phenanthrene has moreover remarkable dielectric properties which inhere to a great extent in the vulcanized products in which the phenanthrene is employed, which properties are an improvement in rubber compositions and products where electrical insulation is a consideration.

It has been found in practicing this invention that the amounts of the above referred to phenanthrene, up to 10% or even higher percentages will not lower or change appreciably the tensile strength or elongation of the rubber products or compositions. In fact, in certain rubber compositions and formulae, the addition of phenanthrene results in an improved tensile strength and other properties, and also a livelier and more resilient compound.

The compositions and products of the present invention are of especial value for purposes where a light colored product is desired. It is well known that coal tar pitch and the usual asphaltic and bituminous components of rubber mixtures are of a black color and correspondingly darken the vulcanized products in the production of which they are employed. The phenanthrene employed in the process of the present invention however, imparts practically no discoloration to the compositions and products in the manufacture of which the phenanthrene is employed. Such vulcanized products and compositions accordingly may be used where white or light colored rubber products are desired and where black products would be undesirable. The advantage of lightness in color as will be evident, is an added advantage in addition to the other desirable properties imparted to the vulcanized products by the phenanthrene. The phenanthrene may, however, be used to advantage in the production of compositions or products where light color is not of importance and where it may even be desirable to produce a dark or black product, the blackness being obtained through the addition of the customary black pigments or compounding materials.

The phenanthrene mentioned in this application may be used as a filler or compounding agent, or both, in the manufacture of rubber products and compositions. As a filler, it has decided advantages as above mentioned; on account of its low gravity, and on account of its non-injurious effect on the desired properties of the manufactured rubber products and compositions. Likewise as a compounding agent, it may be found to have particular advantage in the improvement of the rubber products and compositions, such as giving liveliness (resiliency, etc. to the finished rubber products, and, as a softening, lubricating, etc. effect to the rubber stock during process of manufacture, and other advantages and desired properties both to the finished product and to the stock during process of manufacture, as hereinbefore and hereinafter mentioned in this specification. It is also suitable and may be used as a substitute for rosin oil, vaseline, petrolatum, pine tar and other products in the breaking down of the crude rubber during process of manufacture of rubber products and compositions. Certain grades of the phenanthrene above-mentioned present pronounced wax-like properties, especially and more particularly in connection with its use in rubber products and compositions.

Since the phenanthrene has certain wax-like properties, it may be used as a wax substitute in rubber products and compositions, displacing the cheap and the more expensive waxes. In some cases, such as in the manufacture of insulated wire, rubber tubing, automobile tire inner tubes, etc., in fact wherever rubber products or compositions are pressed through dies, it is found superior to certain waxes. One of its advantages when so used, lies in the fact that a larger percentage of phenanthrene can be used than say for instance, paraffin wax, without practically any "greasing out" effect. Paraffin wax as is well known, "greases out" or shows on the surface and its use is thereby limited in certain rubber products and compositions. In many rubber products, the upper limit for paraffin was on this account, is one to two percent., while in these same products, the amount of phenanthrene which may be successfully used may be much higher. Phenanthrene has been found to give all the desired results of paraffin, such as good ageing of the rubber products, etc., with none of its disadvantages, such as the above referred to "greasing out" effect. Ageing tests have shown that phenanthrene gives very remarkable results in this direction, that is, it has the effect of keeping the rubber products and compositions from oxidizing or changing their physical properties or hardening when these rubber products are kept for considerable periods of time. In manufacturing rubber products, by the die process as above referred to, phenanthrene acts as a lubricant and softener, thereby improving the manufacturing process by speeding up production, and lowering the manufacturing cost, both because of its use to obtain greater production and also because it lowers volume cost of these rubber products and compositions, while at the same time phenanthrene improves the quality of the finished rubber products themselves.

In the production of high grade rubber products and compositions, the higher grades of rubber, such as para or plantation rubbers will usually be employed. For other purposes other rubbers of an inferior grade may be used. In any case, the composition or mix may contain fillers of various kinds, or pigments, or other specific substances, or reagents, such as for example, zinc oxide, lithopone, carbon black, etc., for strengthening or ageing rubber or imparting special properties to the resulting final composition or product.

The vulcanization process can be carried out by the incorporation of an appropriate amount of sulfur either with or without other agents for promoting or modifying the vulcanization process. For hard rubber products more sulfur will be employed than for soft rubber products. The amount of the vulcanizing agent, as well as the time, temperature and pressure of vulcanization, will vary with the nature of the composition and with the character of the product which it is desired to produce, e. g., whether the product is to be a soft vulcanized product or a hard rubber product.

The phenanthrene herein mentioned, may be incorporated with the rubber and other constituents of the mix in any suitable manner. The mixing operation will be promoted by heating the rubber on the mixing mill to such a temperature that the phenanthrene will become plastic or even liquid upon contact with it, care being taken, however, to avoid the use of excessive heat, that might destroy the "nerve" or desired physical properties of the rubber. When the phenanthrene has been broken or ground to suitable fineness, it may be added in this form along with the other ingredients of the mix and incorporated during the rolling or mixing operation. The phenanthrene may also in some cases be incorporated with advantage, by the use of its solutions and by uniform distribution of such solutions throughout the rubber, by the use of solutions of the phenanthrene in solvents, which are likewise solvents of the rubber itself. This will be of special advantage in the production of so-called solutions of rubber, such as are used for waterproofing fabrics and spreader work in general, since the phenanthrene and the rubber may be dissolved in common solvents and a uniform distribution of the phenanthrene and rubber thereby promoted. Where such rubber solutions are made and used, the solvent may be subsequently removed, leaving the phenanthrene intimately combined with the rubber and other constituents of the rubber composition, and the vulcanization may be then effected in any suitable manner, as by the so-called cold vulcanization process, making use of sulfur chlorid, or by the well-known "hot room" process, or otherwise.

It will be understood that so-called waste or reclaimed rubber may be employed in the production of the compositions and products of the present invention, for example, in admixture with the higher grades of rubber, and the waste or regenerated rubber will be modified by the vulcanization thereof, in admixture with the phenanthrene.

Vulcanized products may be similarly prepared by the use of so-called vulcanizable oils, which, upon vulcanization, produce so-called rubber substitutes. The hereinbefore described phenanthrene may, with similar advantages to those above referred to, be incorporated in such compositions, prior to their vulcanization. It will be evident also that vulcanizable oils may be incorporated with rubber in the preparation of composite vulcanized products in the production of which the phenanthrene is also utilized.

The invention will be further illustrated by the following specific examples of compositions made in accordance therewith. These examples are given for illustrative purposes, as the invention is not restricted to the proportions mentioned:

No. 1.

| | |
|---|---|
| Rubber | 42% |
| Sulphur | 3% |
| Litharge | 8% |
| Barytes | 40% |
| Phenanthrene | 7% |

No. 2.

| | |
|---|---|
| Rubber | 55% |
| Sulphur | 23% |
| Gas black | 12% |
| Phenanthrene | 10% |

No. 3.

| | |
|---|---|
| Rubber | 60% |
| Sulphur | 3% |
| Zinc oxide | 29% |
| Phenanthrene | 8% |

No. 4.

| | |
|---|---|
| Rubber | 60% |
| Sulphur | 3% |
| Zinc oxide | 29% |
| Red iron oxide | 5% |
| Phenanthrene | 3% |

Such mixtures may be subjected to vulcanization, for example, for a period of thirty minutes at a steam pressure of forty-five (45) pounds; but the time and pressure (and corresponding temperature) may vary within rather wide limits, depending upon the particular use for which the product is desired.

Where hard rubber products are desired, a much larger percentage of sulfur will be used similar to example No. 2 above and the vulcanization process will be correspondingly modified. So also, various fillers or compounding materials may be used, depending upon the purposes for which the resulting products are desired.

The amount of the hereinbefore described phenanthrene which may be used, in the production of the improved compositions and products of the present invention, may vary within rather wide limits, as will be evident from the specific examples above given, and depending on such considerations as the nature of the mix, the components of which the mix is made up, the object for which the product is desired, and the nature of the vulcanization process, whether hot or cold, and whether for the production of hard or soft rubber products.

While the invention has been more particularly described in connection with vulcanized compositions and products, yet it will be understood that unvulcanized compositions and products may be similarly produced by the incorporation therein of the phenanthrene, and that these compositions may be employed without vulcanization or for purposes where vulcanization is to be subsequently effected, for example in the coating of fabric where the coating is to be subsequently vulcanized. For certain purposes unvulcanized compositions of a more or less plastic character are desired and such compositions are intended to be included within the more comprehensive claims appended hereto. Such compositions, however, are to be distinguished in certain important respects from the vulcanized compositions and products which are more specifically claimed.

I claim:

1. As new articles of manufacture, vulcanized compositions and products having phenanthrene incorporated therein prior to the vulcanization thereof.

2. As new articles of manufacture, rubber compositions and products having phenanthrene incorporated therein prior to the vulcanization thereof.

3. A composition of matter containing rubber and phenanthrene.

4. As new compositions of matter solutions containing vulcanizable material and phenanthrene.

5. As new compositions of matter solutions containing rubber and phenanthrene.

6. The method of producing a vulcanized product which comprises mixing phenanthrene with a vulcanizable ingredient and subjecting the mixture to vulcanization.

7. The method of producing rubber which comprises mixing phenanthrene with a vulcanizable ingredient and subjecting the mixture to vulcanization.

8. The method of producing a vulcanized product which comprises mixing phenanthrene with the other ingredients of the mixture to be vulcanized and subjecting the mixture to vulcanization.

In testimony whereof I affix my signature.

RALPH O. PHILLIPS.